(12) United States Patent
Nevin et al.

(10) Patent No.: US 12,359,653 B2
(45) Date of Patent: Jul. 15, 2025

(54) WIND TURBINE COMPONENT

(71) Applicant: Trelleborg Retford Limited, Gloucestershire (GB)

(72) Inventors: Adam Christopher Nevin, Nottingham (GB); Philip Wayne Brindle, Ely (GB); Andrew Ian Williams, Oldham (GB)

(73) Assignee: Trelleborg Retford Limited, Gloucestershire (GB)

( * ) Notice: Subject to any disclaimer, the term of this patent is extended or adjusted under 35 U.S.C. 154(b) by 232 days.

(21) Appl. No.: 17/779,747

(22) PCT Filed: Nov. 17, 2020

(86) PCT No.: PCT/EP2020/082357
§ 371 (c)(1),
(2) Date: May 25, 2022

(87) PCT Pub. No.: WO2021/104935
PCT Pub. Date: Jun. 3, 2021

(65) Prior Publication Data
US 2022/0403826 A1     Dec. 22, 2022

(30) Foreign Application Priority Data
Nov. 25, 2019  (EP) .................................... 19211242

(51) Int. Cl.
*F03D 80/00*   (2016.01)
*B32B 5/26*    (2006.01)
(Continued)

(52) U.S. Cl.
CPC .............. *F03D 80/00* (2016.05); *B32B 5/263* (2021.05); *B32B 5/2795* (2021.05); *B29C 70/44* (2013.01);
(Continued)

(58) Field of Classification Search
CPC ....... F03D 80/00; F03D 1/0675; B32B 5/263; B32B 2260/023; B32B 2262/101;
(Continued)

(56) References Cited

U.S. PATENT DOCUMENTS 8,992,181 B2 * 3/2015 Fixter .................... H01Q 17/00
                                                     416/223 R
9,404,371 B1 * 8/2016 McDonald .............. F01D 5/147
(Continued)

FOREIGN PATENT DOCUMENTS

EP   2633187 B1   12/2015
GB   2480064 A    11/2011
(Continued)

OTHER PUBLICATIONS

Hong_Kyu, Jang, et al., "Manufacture and characterization of stealth wind turbine blade with periodic pattern surface for reducing radar interference", Composites:Part B, Elsevier, Amsterdam, NL, (Aug. 20, 2013), vol. 56, doi:10.1016/J.COMPOSITESB.2013.08. 043, ISSN 1359-8368, 2014, pp. 178-183.

*Primary Examiner* — Joanna Pleszczynska
(74) *Attorney, Agent, or Firm* — Flaster Greenberg P.C.

(57) ABSTRACT

A wind turbine component, the wind turbine component comprising a laminate of layers with an outer side and an inner side, wherein the outer side faces an exterior of the wind turbine component and the inner side faces an interior of the wind turbine component, the laminate of layers being configured to reflect a radar wave impinging the outer side of the laminate of layers, wherein a reflection loss of the reflected radar wave is below a threshold at a frequency, the laminate of layers comprising: an attenuating layer comprising reinforcing fiberglass or reinforcing carbon fibers, a polymer matrix, and radar absorbing particles; a reflective layer arranged on the inner side of the attenuating layer, the reflective layer being configured to reflect a transmitted
(Continued)

portion of the radar wave, the transmitted portion of the radar wave being a portion of the radar wave that has passed through the attenuating layer.

15 Claims, 8 Drawing Sheets

(51) Int. Cl.
    *F03D 1/06* (2006.01)
    *B29C 70/44* (2006.01)
    *B29L 31/08* (2006.01)
    *B32B 5/02* (2006.01)

(52) U.S. Cl.
    CPC ......... *B29L 2031/085* (2013.01); *B32B 5/024* (2013.01); *B32B 5/026* (2013.01); *B32B 2250/20* (2013.01); *B32B 2260/023* (2013.01); *B32B 2260/046* (2013.01); *B32B 2262/101* (2013.01); *B32B 2262/106* (2013.01); *B32B 2264/105* (2013.01); *B32B 2264/108* (2013.01); *B32B 2603/00* (2013.01)

(58) Field of Classification Search
    CPC ........ B32B 2262/106; B32B 2264/105; B32B 2264/108; B32B 2603/00
    See application file for complete search history.

(56) References Cited

U.S. PATENT DOCUMENTS

| | | | |
|---|---|---|---|
| 9,422,914 B2* | 8/2016 | Appleton | H01Q 15/145 |
| 9,953,738 B2* | 4/2018 | Hwang | H01B 1/04 |
| 10,355,366 B2 | 7/2019 | Kanhere et al. | |
| 2010/0209698 A1* | 8/2010 | Kornherr | D21H 19/82 |
| | | | 428/323 |

FOREIGN PATENT DOCUMENTS

| | | |
|---|---|---|
| GB | 2526795 A | 12/2015 |
| KR | 20120051318 A | 5/2012 |
| KR | 20150090695 A | 8/2015 |
| KR | 101578474 B1 | 12/2015 |

* cited by examiner

WIND TURBINE COMPONENT

TECHNICAL FIELD

The present invention relates, in general, to a fiberglass laminate of layers with enhanced radar reflective properties. More particularly, the invention relates to wind turbine components made of said fiberglass laminate of layers.

BACKGROUND

Radar systems are often used at airports. For example, air traffic control radars and weather radars are common. Wind turbines in the vicinity of the airport may cause radar wave reflections which interfere with the radar system. It may therefore be desirable to reduce the radar reflectivity of wind turbines.

Wind turbine components are often made from fiberglass reinforced plastic. A reduced radar reflectivity may be achieved by applying radar absorbing tiles.

SUMMARY

It is an objective of the invention to provide a wind turbine component with enhanced radar reflective properties. It is a further objective of the invention that the wind turbine component facilitates cost-effective production.

These and other objectives of the invention are at least partly met by the invention as defined in the independent claims. Preferred embodiments are set out in the dependent claims.

According to a first aspect of the invention, there is provided a wind turbine component, the wind turbine component comprising a laminate of layers with an outer side and an inner side, wherein the outer side faces an exterior of the wind turbine component and the inner side faces an interior of the wind turbine component, the laminate of layers being configured to reflect a radar wave impinging the outer side of the laminate of layers, wherein a reflection loss of the reflected radar wave is below a threshold at a frequency, the laminate of layers comprising:

an attenuating layer comprising reinforcing fiberglass or reinforcing carbon fibers, a polymer matrix, and radar absorbing particles;

a reflective layer arranged on the inner side of the attenuating layer, the reflective layer being configured to reflect a transmitted portion of the radar wave, the transmitted portion of the radar wave being a portion of the radar wave that has passed through the attenuating layer.

A laminate of layers with a reflective layer and at least one attenuating layer may have a low reflectivity for radar waves. The at least one attenuating layer may absorb part of an impinging radar wave. Furthermore, a reflection from one of the interfaces of the attenuating layer, e.g. an interface between the attenuating layer and air or an interface between the attenuating layer and another layer of the laminate, may interfere with a reflection from the reflective layer. The interference may be at least partially destructive such that the reflections at least partially cancel each other out. Absorbance and interference may cooperate to reduce the reflectivity of a radar wave at a particular frequency. The laminate of layers may comprise more than one attenuating layer. The laminate of layers may also comprise one or more phase shifting layers, e.g. layers with a thickness designed to set a distance between two layers, or layer interfaces, such that reflections from these two layers, or layer interfaces, interfere at least partially destructively. A phase shifting layer may be a layer which does not substantially attenuate a transmitted radar wave. However, it should be understood that an attenuating layer may simultaneously act as a phase shifting layer.

In the following the inventive concept will mainly be described using attenuating layers comprising reinforcing fiberglass by way of example. However, it should be understood that the concepts described may be applicable also to attenuating layers comprising reinforcing carbon fibers.

It is a realization of the invention that an attenuating layer of a wind turbine component does not need to be a separate layer. In particular, if the wind turbine component is produced as a fiberglass reinforced plastic a separate attenuating layer does not necessarily need to be applied as a layer on top of the fiberglass reinforced plastic. The attenuating layer may in fact be incorporated within the fiberglass reinforced plastic. Instead of e.g. adding a circuit analogue layer of carbon-ink, which may be expensive to manufacture, an outer skin of the wind turbine component radar absorbing particles may be incorporated in a layer of reinforcing fiberglass and a polymer matrix. Thus, the attenuating layer may both serve the purpose of attenuating a radar wave as well as acting as a load bearing component.

The wind turbine component may be e.g. a rotor blade. However, it may also be e.g. the nacelle or nose cone of the wind turbine.

The laminate of layers may be configured to achieve a specific reflection loss at a specific frequency by setting the number of layers, the type of layers, the thickness of the layers as well as the amount or concentration of the radar absorbing particles in the attenuating layer or layers. It should be understood that several different configurations may result in the same reflection loss at a specific frequency.

The frequency for which the wind turbine component is designed for may herein be defined by the type of radar used in the area where the wind turbine will be erected. Radars typically used at airports often operate in the L-band (1-2 GHz), the S-band (2-4 GHz), the C-band (4-8 GHz) or the X-band (8-12 GHz). For example, a long-range air traffic control radar may operate in the L-band, a terminal air traffic control may operate in the S-band, a weather radar may operate in the C-band and a precision approach radar may operate in the X-band. Thus, the wind turbine component may be designed to provide a reflection loss below a threshold at a frequency in the range of 1-12 GHz. The wind turbine component may also be designed to provide a reflection loss below a threshold at a frequency in one or more of the above mentioned radar bands.

The reflection loss may also be called return loss. The reflection loss may be defined as the ratio between the power of a radar wave reflected by the wind turbine component and the power of the incoming radar wave. The reflection loss may also be defined as the ratio between the power of a radar wave reflected by the wind turbine component and the power of the incoming radar wave at normal incidence.

The reflection loss required may depend on the intended location of the wind turbine component. If it is going to be placed close to a radar system sensitive to interference, the wind turbine component may be designed to give a reflection loss below −20 dB at the frequency of the radar system. If it is going to be placed further away, the wind turbine component may be designed to give a reflection loss below −10 dB at the frequency of the radar system. If it is going to be placed far away or if the radar system is insensitive to interference, the wind turbine component may be designed to give a reflection loss below −5 dB at the frequency of the radar system. Thus, the threshold may e.g. be −20 db, −10 dB, or −5 dB. It should of course be understood that other thresholds are also possible depending on the requirements for the location of the wind turbine component.

The wind turbine component may be configured to be produced by any fiberglass construction method. However, construction methods particularly suitable may be a resin infusion method or a prepreg method.

The reflective layer is arranged on the inner side of the attenuating layer. The reflective layer may thus be the innermost layer of the laminate of layers. However, it does not necessarily need to be the innermost layer, there may also be other layers further in, e.g. layers of reinforcing fiberglass in a polymer matrix. The reflective layer may e.g. comprise reinforcing fiberglass, a polymer matrix, and metal particles. It may also comprise a continuous metal layer. The reflective layer may be a layer with a reflectivity to a radar wave at the frequency, wherein the reflectivity of the reflective layer is higher than the reflectivity of the attenuating layer. The reflective layer may also be a layer with a reflectivity to a radar wave at the frequency, wherein the reflectivity is higher than 25%. The reflective layer may also be a layer with a reflectivity to a radar wave at the frequency, wherein the reflectivity is higher than 50%. The reflective layer may also be a layer with a reflectivity to a radar wave at the frequency, wherein the reflectivity is higher than 90%. It should be understood that the reflective layer may comprise the same type of particles as the attenuating layer. For example, both the reflective layer and the attenuating layer may comprise metal particles. However, the amount of particles or the concentration of particles may be higher in the reflective layer.

The attenuating layer may be arranged on the outer side of the reflective layer. However, the attenuating layer does not necessarily need to be arranged as the outermost layer. There may e.g. be several attenuating layers. There may also be other layers outside the outermost attenuating layer, e.g. a gel coat for corrosion protection. The radar absorbing particles may be particles of a material that interacts with the electric field of the radar wave or material that interacts with the magnetic field of the radar wave or a combination thereof.

It should be understood that a material that interacts with the electric field of the radar wave may be an electrically conducting material, a high dielectric-loss material, or a material which interacts with the electric field through dielectric loss due to polarization-relaxation. The material which interacts with the electric field of the radar wave may be e.g. carbon black, graphene, carbon nanotubes, a metal-organic framework, a conducting polymer etc. Examples of metal-organic frameworks are MIL-100, MIL-101, MIL-53, UiO-66, NU-1000, and HKUST-1. MIL-100(Fe) may be particularly useful.

It should be understood that a material that interacts with the magnetic field of the radar wave may be a high magnetic-loss material. The material that interacts with the magnetic field of the radar wave may be e.g. ferrite. The term ferrite is here considered to include magnetite. Magnetite may be a magnetic particle of particular interest.

The reinforcing fiberglass may comprise glass fibers. The glass fibers may be intertwined to form a fiberglass fabric, e.g. randomly intertwined to form a continuous strand mat. The glass fibers may also be woven or knitted together to form a fiberglass fabric.

The reinforcing fiberglass may be encased in the polymer matrix. The polymer matrix may also encase the radar absorbing particles. The polymer matrix encasing the radar absorbing particles and a plurality of sheets of fiberglass fabric on top of each other may form the attenuating layer. Thus, the thickness of the attenuating layer may be defined by the number of sheets of fiberglass fabric. Consequently, the number of sheets of fiberglass fabric in the attenuating layer may contribute to setting the reflection loss of the wind turbine component. The thickness of the attenuating layer may define the attenuation of the layer, a radar wave may be attenuated more when it passes a thicker layer than when it passes a thinner layer. The thickness of the attenuating layer may also contribute to a phase difference between two reflections. The phase difference between a reflection from an outward facing surface of the attenuating layer and a reflection from e.g. a reflective layer on the inner side of the attenuating layer, with or without an intermediate phase shifting layer, may be defined by the number of sheets of fiberglass fabric in the attenuating layer.

The polymer matrix of the attenuating layer may be a thermosetting polymer or a thermoplastic. The polymer matrix may e.g. be epoxy, polyester, vinylester or polyurethane.

A wind turbine component according to the inventive concept may perform better than alternative wind turbine components with low radar wave reflectivity. For example, by incorporating both radar absorbing particles and fiberglass in the attenuating layer, the attenuating layer may be made thicker, e.g. thicker than a printed circuit analogue layer, and thereby absorb radar waves better.

A wind turbine component according to the inventive concept may be lighter than alternative wind turbine components. The added weight of the radar absorbing particles and the reflective layer may be negligible in comparison to the weight of a wind turbine component without these features.

A wind turbine component according to the inventive concept may also have better aerodynamic properties than e.g. wind turbine components with radar attenuating tiles placed as a separate layer on the outside of the wind turbine component. Seams between tiles may form surface irregularities which degrade the aerodynamic properties. Tiles may also have to be manufactured from a soft material to conform to the shape of the surface of the wind turbine component. A softer material may make tiles more sensitive to corrosion. Thus, a wind turbine component according to the inventive concept may be more resilient against corrosion.

A wind turbine component according to the inventive concept may also be produced in a cost-effective manner. By incorporating both radar absorbing particles and fiberglass in the attenuating layer, the design frequency may be tuned by simply changing the thickness of this layer and/or changing the thickness of the phase shifting layer. For example, a wind turbine component configured for a first radar band may be produced using the same material as a wind turbine component configured for a second radar band. The only difference between the two wind turbine components may be the thicknesses of the layers, which may easily be set during production, e.g. by setting a number of fiberglass sheets that a layer comprises. Since the same material may be used for different wind turbine components, regardless of which radar bands they should be optimized for, the material stock in the factory may be simplified which may save cost. It may e.g. be expensive to keep a stock comprising many different versions of radar absorbing tiles or circuit analogue sheets designed for different frequencies.

The wind turbine component may further comprise a phase shifting layer, the phase shifting layer being a layer between the attenuating layer and the reflective layer, the phase shifting layer comprising reinforcing fiberglass or reinforcing carbon fibers and a polymer matrix;

wherein the phase shifting layer has a thickness configured to set a phase difference between a radar wave reflection from the attenuating layer and a radar wave reflection from the reflective layer, the phase difference being configured to give at least partially destructive interference between the radar wave reflection from the attenuating layer and the radar wave reflection from the reflective layer at the frequency.

The polymer matrix of the phase shifting layer may be a thermosetting polymer or a thermoplastic. The polymer matrix may e.g. be epoxy, polyester, vinylester or polyurethane. The polymer matrix of the phase shifting layer may be the same as the polymer matrix of the attenuating layer. However, different polymer matrices may also be used for different layers within the laminate of layers. By incorporating reinforcing fiberglass in the phase shifting layer it may adjust the phase between two or more reflections but also bear a larger part of the load subjected to the wind turbine component than if no reinforcing fibers were used. The reinforcing fiberglass of the phase shifting layer may form a fiberglass fabric, e.g. continuous strand mats or woven or knitted fiberglass fabric. The reinforcing fiberglass may be encased in the polymer matrix. The polymer matrix encasing a plurality of sheets of fiberglass fabric on top of each other may form the phase shifting layer. Thus, the thickness of the phase shifting layer may be defined by the number of sheets of fiberglass fabric. Consequently, the number of sheets of fiberglass fabric in the phase shifting layer may contribute to setting the reflection loss of the wind turbine component.

The phase difference, configured to give at least partially destructive interference between the radar wave reflection from the attenuating layer and the radar wave reflection from the reflective layer at the frequency, may be a phase difference of 180°. Thus, the two reflections may be of opposite phase. However, the phase difference does not necessarily need to be exactly 180°. Other phase differences may also give partial destructive interference, e.g. a phase difference in the range of 90°-270°, or a phase difference in the range of 135°-225°. The phase difference may of course be the above mentioned phase differences plus a multiple of 360°. Consider a wind turbine component with a reflective layer below a phase shifting layer and an attenuating layer above the phase shifting layer, wherein the attenuating layer is thin in comparison to the wavelength of an impinging radar wave. In this case, a thickness of the phase shifting layer could be e.g. a quarter of the wavelength. It should be understood that if the attenuating layer is not thin in comparison to the wavelength of the impinging radar wave the phase shifting layer thickness may need to be adjusted. For example, the thickness of the phase shifting layer in the above example could be reduced to account for the finite thickness of the attenuating layer such that the reflection from an outermost surface of the attenuating layer is of opposite phase to a reflection from the reflective layer.

The magnitude of the radar wave reflection from the attenuating layer and the radar wave reflection from the reflective layer may be set to be equal or similar. The relative magnitude may e.g. be set by the attenuation in the attenuating layer, e.g. defined by an amount of radar absorbing particles and/or the thickness of the attenuating layer. If the radar wave reflection from the attenuating layer and the radar wave reflection from the reflective layer have the same magnitude and opposite phase as they leave the wind turbine component, they may completely cancel each other out. However, also partial cancellation may be beneficial. Thus, the phase does not necessarily need to be completely opposite and the magnitude does not necessarily need to be exactly the same. The magnitude of the radar wave may herein be the amplitude of the radar wave.

The radar absorbing particles of the attenuating layer of the wind turbine component may comprise at least one of: carbon nanotubes, carbon black or graphene.

Such radar absorbing particles may give a large attenuation. They may also be cheap.

The radar absorbing particles of the attenuating layer of the wind turbine component may comprise single-wall carbon nanotubes. The single-wall carbon nanotubes may be metallic single-wall carbon nanotubes. The single-wall carbon nanotubes may also be semiconducting single-wall carbon nanotubes.

Single-wall carbon nanotubes may be particularly effective radar absorbing particles. Furthermore, if the single-wall carbon nanotubes are attached to the fiberglass fibers it may improve the wet out of the fiberglass as a resin is applied to form the polymer matrix. Single-wall carbon nanotubes attached to the fiberglass fibers may make the fiberglass fiber attract the resin more easily. Single-wall carbon nanotubes attached to the fiberglass fibers may improve the contact angle (or wetting angle) between the resin and the fiberglass fiber. It is possible that multiwalled carbon nanotubes can supply the same improvements or similar improvements. Improved wet out of the fiberglass may improve the manufacturing process of the wind turbine component. Resin may flow more easily between intertwined glass fibers. In a resin infusion process this may mean that fewer resin inlets are needed and that fewer wind turbine components need to be discarded due to insufficient infusion of the resin. Thus, the manufacturing process may be made more cost effective. Improved wet out may be particularly important for wind turbine rotor blades due to their large size.

The reflective layer of the wind turbine component may comprise reinforcing fiberglass or reinforcing carbon fibers, a polymer matrix, and metal particles. Incorporating metal particles in the reflective layer may be an efficient way of achieving sufficient reflectivity. The metal particles may e.g. be attached to the fiberglass or dispersed in the polymer matrix. The metal particles may e.g. be aluminum particles. Aluminum may be suitable as it does not add too much weight to the wind turbine component.

The radar absorbing particles of the attenuating layer of the wind turbine component may be attached to the reinforcing fiberglass or reinforcing carbon fibers of the attenuating layer.

Attaching the radar absorbing particles to the fiberglass may facilitate improvements in the production method of the wind turbine component. For example, it is a realization of the invention that the resin infusion production method of a wind turbine component may be improved when the radar absorbing particles are attached to the fiberglass. In a resin infusion process, sheets of fiberglass fabric may be stacked on top of each other on top of a mold. The sheets of fiberglass fabric may then be infused with a polymer resin and the polymer resin may subsequently be cured to form the polymer matrix. It is a realization that it may be difficult to produce a laminate of layers, wherein the radar absorbing properties is varying from one layer to another, if the radar absorbing particles are dispersed in the polymer resin. By attaching the radar absorbing particles to the fiberglass, the radar absorbing properties of the future laminate layers may be defined already as the dry sheets of fiberglass fabric are arranged on top of each other. The attenuating layer may e.g. comprise a plurality of sheets of fiberglass fabric with attached radar absorbing particles such that when infused with resin and cured the finished layer has a distribution of radar absorbing particles throughout the entire thickness of the layer. A laminate of layers may e.g. be produced by stacking X sheets of fiberglass fabric with attached radar absorbing particles, Y sheets of fiberglass fabric without particles, and Z sheets of fiberglass fabric with attached metal particles, wherein X, Y, and Z are integer numbers. The entire stack may subsequently be infused with polymer resin and cured to form a laminate of three layers. An attenuating layer with a thickness defined by X, a phase shifting layer with a thickness defined by Y, and a reflective layer with a thickness defined by Z.

A wind turbine component produced using fiberglass with attached radar absorbing particles may be produced at a low cost. There may not be any need for attaching radar absorbing layers post-curing. The wind turbine component may also be durable. As the radar absorbing structure may be incorporated into the load bearing structure there may be no need for extra layers which may fall off or degrade.

The radar absorbing particles of the attenuating layer of the wind turbine component may be dispersed in the polymer matrix of the attenuating layer. Dispersing the radar absorbing particles in the polymer matrix may be an efficient way of producing an attenuating layer with a homogeneous distribution of radar absorbing particles. Standard sheets of fiberglass fabric may herein be used which may save cost. For example, if no phase shifting layer is required it may be sufficient to stack a reflective film and a number of sheets of fiberglass fabric followed by resin infusion with a polymer resin comprising radar absorbing particles. After curing the radar absorbing particles may consequently be distributed throughout the entire polymer matrix. It may also be possible to combine layers with sheets of fiberglass fabric without particles and layers with sheets of fiberglass fabric with attached radar absorbing particles and infuse them with a polymer resin comprising radar absorbing particles. Thereby, a laminate of layers comprising two attenuating layers with different attenuating properties may be formed.

The attenuating layer of the wind turbine component may comprise a plurality of cured prepreg sheets, the prepreg sheets being sheets of reinforcing fiberglass or reinforcing carbon fibers, pre-impregnated with polymer resin and the radar absorbing particles, wherein the attenuating layer is formed by bonding the prepreg sheets together by curing the polymer resin to form the polymer matrix.

In the following the prepreg sheets will be discussed, by way of example, as being fiberglass prepregs, i.e. sheets of reinforcing fiberglass pre-impregnated with polymer resin and radar absorbing particles. However, it should be understood that the concepts may also be applicable to prepregs wherein the reinforcing fibers are carbon fibers.

Incorporating the radar absorbing particles to the fiberglass may facilitate improvements in the production method of the wind turbine component. For example, it is a realization of the invention that the prepreg production method of a wind turbine component may be improved when the radar absorbing particles are incorporated in the prepreg. It should be understood that the polymer resin of the prepreg may be partially cured to allow easy handling. A number of prepregs may be stacked on top of each other, then pressed together and cured fully such that polymer resin forms the polymer matrix. It should be understood that the radar absorbing particles may be attached to the fiberglass of the prepreg or dispersed in the polymer resin which the fiberglass is pre-impregnated with. Prepregs with radar absorbing particles may be stacked on top or underneath prepregs without particles. Thus, attenuating layers may be combined with phase shifting layers.

A wind turbine component produced using prepregs with radar absorbing particles may be produced at a low cost. There may not be any need for attaching radar absorbing layers post-curing. The wind turbine component may also be durable. As the radar absorbing structure may be incorporated into the load bearing structure there may be no need for extra layers which may fall off or degrade.

The laminate of layers of the wind turbine component may be configured to have a reflection loss below the threshold at a frequency in the L-band, in the S-band or in the X-band, the L-band being a frequency band between 1 GHz and 2 GHz, the S-band being a frequency band between 2 GHz and 4 GHz, the X-band being a frequency band between 8 GHz and 12 GHz. These bands may be particularly common around airports. However, it should be understood that the wind turbine component may also be configured to have a reflection loss below the threshold at any frequency between 1 and 12 GHz or at any other frequency.

The laminate of layers of the wind turbine component may be configured to have a reflection loss below the threshold at a frequency in the S-band as well as at a frequency in the X-band. Such a wind turbine component may be suitable at a location in the vicinity of both a S-band radar and a X-band radar. Thus, interference effects on both radars may be mitigated simultaneously. It should be understood that in this case the laminate of layers may comprise a plurality of layers. For example, a plurality of attenuating layers and/or a plurality of phase shifting layers.

The laminate of layers may also be configured to have a reflection loss below the threshold at a frequency in the L-band as well as at a frequency in the X-band. Such a wind turbine component may be suitable at a location in the vicinity of both a L-band radar and a X-band radar.

According to an example of the present inventive concept there is provided a fiberglass prepreg sheet for prepreg production of the attenuating layer in a wind turbine component according to the first aspect, the fiberglass prepreg sheet comprising reinforcing fiberglass pre-impregnated with a polymer resin and radar absorbing particles.

The prepreg may comprise a plurality of fiberglass fibers, the fiberglass fibers being intertwined to form the fiberglass fabric. For example, the plurality of fiberglass fibers may be randomly intertwined to form a continuous strand mat. The fiberglass fibers may also be woven or knitted together to form a fiberglass fabric.

The prepreg may be configured to be stronger in one particular direction than in other directions after curing. For example, the prepreg may be configured to have most of the fiberglass fibers aligned along a direction that corresponds to the length direction of a wind turbine rotor blade after the production of the wind turbine rotor blade.

A wind turbine component produced from a fiberglass prepreg according to the example of the invention may have the same advantages, or similar advantages, as the wind turbine component encompassed by the claims in this application and may possibly be the subject of a future divisional application.

It should be understood that a prepreg according to the example may be used for other components than a wind turbine component. Thus, there is provided a fiberglass prepreg sheet for prepreg production of an attenuating layer in a component, the fiberglass prepreg sheet comprising reinforcing fiberglass pre-impregnated with a polymer resin and radar absorbing particles. Such a prepreg may possibly be the subject of a future divisional application.

According to a second aspect of the present inventive concept there is provided a reinforcing fiber fabric for production of the attenuating layer in a wind turbine component according to the first aspect, the reinforcing fiber fabric comprising a plurality of reinforcing fibers onto which radar absorbing particles are attached, the plurality of reinforcing fibers being reinforcing fiberglass or reinforcing carbon fibers, wherein the reinforcing fibers are intertwined to form the reinforcing fiber fabric.

In the following the reinforcing fiber fabric will be discussed, by way of example, as being fiberglass fabric, i.e. sheets of reinforcing fiberglass, wherein the fiberglass fibers are intertwined to form the fiberglass fabric. However, it should be understood that the concepts may also be applicable to reinforcing fiber fabric wherein the reinforcing fibers are carbon fibers. The fiberglass fabric may be configured to be stronger in one particular direction than in other directions. For example, the fiberglass fabric may be configured to have most of the fiberglass fibers aligned along a direction that corresponds to the length direction of a wind turbine rotor blade after the production of the wind turbine rotor blade.

The radar absorbing particles may be incorporated into a sheet of fabric, e.g. a textile sheet or cloth, which is in turn attached to the fiberglass fabric. Thereby, a fiberglass fabric with a radar absorbing cloth backing could be produced.

The radar absorbing particles may also be attached directly to the glass of the fiberglass fibers or in the sizing of the fiberglass fibers. The radar absorbing particles may also be attached to the surface of the sizing of the fiberglass fibers. The radar absorbing particles may be attached to the sizing surface as the sizing is applied to the glass of the fiberglass. The radar absorbing particles may also be attached to the sizing surface after the sizing has been applied. For example, by soaking a fiberglass fiber or a sheet of fiberglass fabric in a solution containing the radar absorbing particles. Fiberglass could e.g. be soaked in a solution comprising single-wall carbon nanotubes.

A wind turbine component produced from a fiberglass fabric according to the second aspect of the invention may have the same advantages, or similar advantages, as the wind turbine component encompassed by the claims in this application and may possibly be the subject of a future divisional application.

It should be understood that a fiberglass fabric according to the second aspect of the invention may be used for other components than a wind turbine component. Thus, there is provided a fiberglass fabric for production of the attenuating layer in a component, the fiberglass fabric comprising a plurality of fiberglass fibers onto which radar absorbing particles are attached, the plurality of fiberglass fibers being intertwined to form the fiberglass fabric. Such a fiberglass fabric may possibly be the subject of a future divisional application.

The radar absorbing particles in the reinforcing fiber fabric may be incorporated in a reinforcing fiber sizing attached to the reinforcing fibers, the reinforcing fiber sizing being a coating on the reinforcing fiber, the coating being configured to bond to a polymer matrix.

The reinforcing fiber sizing may be a sizing on a reinforcing fiberglass fiber, i.e. a fiberglass sizing, or on a reinforcing carbon fiber. In the following the reinforcing fiber sizing will be described in terms of a fiberglass sizing. However, it should be understood that the concepts described may be applicable also to a sizing on a carbon fiber.

The fiberglass sizing may comprise a film former. The film former may be chemically similar to the polymer matrix into which the fiberglass fabric is intended to be incorporated. The fiberglass sizing may further comprise a coupling agent configured to bond to the fiberglass fiber as well as the polymer matrix. The coupling agent may e.g. be an organic silane. The radar absorbing particles may be dispersed within the fiberglass sizing. The radar absorbing particles may also be distributed on the outer surface of the fiberglass sizing. The fiberglass sizing may also comprise an amphiphilic chemical acting as a surfactant. The amphiphile may herein be a compound where half of the compound binds to the glass, e.g. via silanol or a hydroxyl group, and half of the compound binds to the polymer resin, e.g. via an amine or a hydroxyl group.

According to a third aspect of the present inventive concept there is provided a kit of parts for resin infusion production of an attenuating layer in a wind turbine component according to the first aspect, the kit of parts comprising a reinforcing fiber fabric according to the second aspect and a polymer resin suitable for resin infusion of the reinforcing fiber fabric, wherein a reinforcing fiber sizing of the reinforcing fibers and the polymer resin are configured to bond to each other when cured.

A wind turbine component produced from a kit of parts according to the third aspect of the invention may have the same advantages, or similar advantages, as the wind turbine component encompassed by the claims in this application and may possibly be the subject of a future divisional application.

In the following the kit of parts will be described as a kit of parts where the reinforcing fiber fabric is a fiberglass fabric. However, it should be understood that the concepts described may be applicable also to a carbon fiber fabric.

By supplying the fiberglass fabric together with the polymer resin a high strength of the finished wind turbine component may be facilitated. The fiberglass sizing and the polymer resin may be adapted to each other such that the bonding between the fiberglass and the polymer matrix becomes sufficiently strong. Adding radar absorbing particles to the fiberglass sizing may affect the bonding. This may be compensated for by changes in the polymer resin.

By supplying the fiberglass fabric together with the polymer resin, a sufficient production yield may be ensured. The polymer resin may need to be adapted to ensure sufficient wet out of the fiberglass fabric. The viscosity of the polymer resin may need to be sufficiently low, e.g. below 1000 centipoise, below 700 centipoise, or below 500 centipoise, to ensure that the polymer resin flows sufficiently well through a stack of dry fiberglass fabric. If the viscosity is too high the polymer resin may never reach some parts of the wind turbine component and it may need to be discarded. This may result in a low yield. Radar absorbing particles in the fiberglass sizing may affect how the polymer resin infuses the fiberglass fabric, e.g. by affecting the wetting angle. If the wetting angle is degraded when the radar absorbing particles are included in the sizing the viscosity of the polymer resin may need to be reduced. The wetting angle may also be improved, e.g. by adding single-wall carbon nanotubes to the surface of the sizing. A higher viscosity of the polymer resin may then be tolerated. A higher viscosity polymer resin may e.g. give a stronger polymer matrix after curing.

It should be understood that radar absorbing particles may also be added to the polymer resin. This could increase the viscosity of the polymer resin. Thus, the composition of the polymer resin may need to be changed if radar absorbing particles are to be added.

According to a fourth aspect of the present inventive concept there is provided a resin infusion method for producing a wind turbine component, the method comprising:

placing a plurality of reinforcing fiber fabric sheets on top of each other on top of a mold, wherein the reinforcing fiber fabric sheets comprise reinforcing fiber fabric according to the second aspect and wherein the mold forms a shape of at least part of the wind turbine component;

placing a flexible film on top of the plurality of reinforcing fiber fabric sheets, wherein the flexible film is impermeable to air, the flexible film forming at least part of a vacuum bag which surrounds the plurality of reinforcing fiber fabric sheets;

evacuating air from the vacuum bag such that a vacuum is formed within the plurality of fiberglass fabric sheets, thereby pressing the flexible film against the plurality of reinforcing fiber fabric sheets to force the plurality of reinforcing fiber fabric sheets to adapt the shape of the mold;

admitting a polymer resin to the vacuum bag such that the vacuum pulls the resin into voids within the plurality of reinforcing fiber fabric sheets, thereby infusing the plurality of reinforcing fiber fabric sheets with the polymer resin;

curing the polymer resin such that polymer resin solidifies to form a polymer matrix.

In the following the resin infusion method will be described, by way of example, using fiberglass fabric as reinforcing fiber fabric. However, it should be understood that the resin infusion method may also be implemented using carbon fiber fabric as reinforcing fiber fabric.

A wind turbine component produced according to the fourth aspect of the invention may have the same advantages, or similar advantages, as the wind turbine component encompassed by the claims in this application and may possibly be the subject of a future divisional application.

It should be understood that e.g. a wind turbine rotor blade may be manufactured in two or more parts. For example, the blade may be produced in two halves which are later merged along an intersection running along the length of the blade. The mold may herein form the shape of one half of the rotor blade. A half shell of a rotor blade may thus be formed such that when the two halves are merged they form a full shell with a void within.

Sheets of fiberglass fabric may be stacked in the mold. The flexible film may be placed on top of the sheets of fiberglass fabric. A vacuum bag may be formed either by the flexible film on one side and the mold on the other side. Alternatively, the flexible film may form the entire vacuum bag, the vacuum bag enclosing both the mold and the sheets of fiberglass fabric.

It should be understood that the mold may not be covered only with fiberglass fabric with radar absorbing particles attached. The mold may also be covered with fiberglass fabric without attached particles, fiberglass fabric with metal particles attached, one or more reflective film etc. Together these may make up the laminate of layers configured to set the reflection loss at a certain frequency. There may additionally be further sheets of fiberglass fabric to provide a required structural integrity. The number of further sheets of fiberglass fabric may not necessarily be the same at every point of the mold. For structural reasons the rotor blade shell may need to be thicker at some places. These places may require a larger number of sheets of fiberglass fabric. However, the laminate of layers which is configured to set a reflection loss may have the same thickness over the entire wind turbine component. The corresponding sheets of fiberglass fabric may run across the entire mold.

When air is evacuated from the vacuum bag the flexible film may press against the entire stack of sheets of fiberglass fabric such that they conform to the shape of the mold. A polymer resin may be admitted and sucked into the sheets of fiberglass fabric by the vacuum, thereby infusing the sheets of fiberglass fabric. The polymer resin may subsequently be cured to form the polymer matrix. The polymer resin may be cured at a temperature above room temperature.

According to a fifth aspect of the present inventive concept there is provided a prepreg method for producing a wind turbine component, the method comprising:

placing a plurality of radar absorbing prepreg sheets on top of each other on top of a mold, wherein each of the radar absorbing prepreg sheets comprises reinforcing fiberglass or reinforcing carbon fibers, the reinforcing fiberglass or reinforcing carbon fibers being pre-impregnated with a polymer resin and radar absorbing particles, and wherein the mold forms a shape of at least part of the wind turbine component;

pressing the plurality of radar absorbing prepreg sheets against the mold such that the plurality of radar absorbing prepreg sheets adapt the shape of the mold;

curing the plurality of prepreg sheets such that the plurality of prepreg sheets bond together and the polymer resin solidifies to form a polymer matrix, the polymer matrix encasing the reinforcing fiberglass or reinforcing carbon fibers and the radar absorbing particles.

In the following the prepreg method will be described, by way of example, using fiberglass prepreg sheets. However, it should be understood that the prepreg method may also be implemented using prepreg sheets with carbon fibers as reinforcing fibers. A wind turbine component produced according to the fifth aspect of the invention may have the same advantages, or similar advantages, as the wind turbine component encompassed by the claims in this application and may possibly be the subject of a future divisional application.

The prepreg method may in many ways be similar to the resin infusion method. For example, a plurality of radar absorbing fiberglass prepreg sheets may be combined with a plurality fiberglass prepreg sheets without particles, a prepreg sheet with radar reflective properties, a reflective film etc. The plurality of radar absorbing fiberglass prepreg sheets, and other prepreg sheets or layers, may also be pressed against the mold using a vacuum bag and vacuum in a similar fashion to the resin infusion method. The curing may be performed in a similar fashion to the resin infusion method. The fiberglass prepregs may be cured at a temperature above room temperature.

According to a sixth aspect of the present inventive concept there is provided a reinforcing fiber fabric, the reinforcing fiber fabric comprising a plurality of reinforcing fibers onto which radar absorbing particles are attached, the plurality of reinforcing fibers being reinforcing fiberglass or reinforcing carbon fibers, wherein the reinforcing fibers are intertwined to form the reinforcing fiber fabric, wherein the radar absorbing particles forms a conformal coating around each reinforcing fiber of the plurality of reinforcing fibers.

The reinforcing fiber fabric according to the sixth aspect may be configured to be used for production of the attenuating layer in a wind turbine component according to the first aspect. Alternatively, the reinforcing fiber fabric may be used in other components.

A conformal coating around each reinforcing fiber may herein refer to a continuous or discontinuous coating that conforms to the surface of the reinforcing fiber around the circumference of the reinforcing fiber. A conformal coating around each reinforcing fiber may additionally or alternatively refer to a coating wherein the radar absorbing particles are evenly distributed around the circumference of the reinforcing fiber. A conformal coating around each reinforcing fiber may additionally or alternatively refer to a coating wherein the probability of finding a radar absorbing particle is constant around the circumference of the reinforcing fiber.

Such a conformal coating may have the advantage that it is easily applied to the reinforcing fiber fabric. The reinforcing fiber fabric may e.g. be soaked in a solution containing the radar absorbing particles. Several sheets of reinforcing fiber fabric may be simultaneously soaked in a solution containing the radar absorbing particles. Alternatively, a sheet of reinforcing fiber fabric may be passed from one reel to another while passing through a solution containing the radar absorbing particles. Once a sheet of reinforcing fiber fabric has been soaked in a solution containing the radar absorbing particles, the sheet of reinforcing fiber fabric may be dried, whereby the radar absorbing particles may stick to the reinforcing fibers and conformally coat them. Alternatively, the conformal coating may be applied to the reinforcing fibers before these are intertwined to form the reinforcing fiber fabric.

Reinforcing fiber fabric according to the sixth aspect may be a cheap option for forming the attenuating layer in a radar absorbing structure due to the easy application of the conformal coating. Further, the radar attenuating properties of such an attenuating layer may exceed the radar attenuating properties of alternative attenuating layers. For example, a high concentration of radar absorbing particles may be achieved when these conformally coat the reinforcing fibers.

The conformal coating may be a coating onto the glass of a fiberglass fiber or a coating onto the sizing of a fiberglass fiber. Alternatively, the conformal coating may be the sizing of a fiberglass fiber.

The conformal coating may comprise solely the radar absorbing particles. One example hereof may be radar absorbing particles scattered around the circumference of the reinforcing fiber, e.g. radar absorbing particles dried onto the reinforcing fiber. Radar absorbing particles may be attached to a reinforcing fiber by electrostatic forces or van der Waals forces. Thus, the radar absorbing particles need not necessarily need to be chemically attached to the reinforcing fibers. The radar absorbing particles may be attached like settled dust or dried on residues. Alternatively, the radar absorbing particles may be chemically attached to a reinforcing fiber by forming ionic or covalent bonds to the reinforcing fiber.

The conformal coating may comprise the radar absorbing particles and an adhesive configured to attach the radar absorbing particles to the reinforcing fibers. The adhesive may be a polymer. The conformal coating may be configured to coat each reinforcing fiber of the plurality of reinforcing fibers while leaving voids between the reinforcing fiber of the plurality of reinforcing fibers. Thus, the reinforcing fiber fabric may be used in a resin infusion production method wherein resin fills the voids and thereby connects two reinforcing fiber fabric sheets.

According to a seventh aspect of the present inventive concept there is provided a wind turbine component, the wind turbine component comprising a laminate of layers with an outer side and an inner side, wherein the outer side faces an exterior of the wind turbine component and the inner side faces an interior of the wind turbine component, the laminate of layers being configured to reflect a radar wave impinging the outer side of the laminate of layers, wherein a reflection loss of the reflected radar wave is below a threshold at a frequency, the laminate of layers comprising:
   an attenuating layer comprising a reinforcing fiber fabric and a polymer matrix, wherein the reinforcing fiber fabric comprises a plurality of reinforcing fibers onto which radar absorbing particles are attached, the plurality of reinforcing fibers being reinforcing fiberglass or reinforcing carbon fibers, wherein the reinforcing fibers are intertwined to form the reinforcing fiber fabric, wherein the radar absorbing particles forms a conformal coating around each reinforcing fiber of the plurality of reinforcing fibers; and
   a reflective layer arranged on the inner side of the attenuating layer, the reflective layer being configured to reflect a transmitted portion of the radar wave, the transmitted portion of the radar wave being a portion of the radar wave that has passed through the attenuating layer.

According to an eighth aspect of the present inventive concept there is provided a resin infusion method for producing a wind turbine component, the method comprising:
   placing a plurality of reinforcing fiber fabric sheets on top of each other on top of a mold, wherein the reinforcing fiber fabric sheets comprise at least one sheet of reinforcing fiber fabric according to the sixth aspect and wherein the mold forms a shape of at least part of the wind turbine component;
   placing a flexible film on top of the plurality of reinforcing fiber fabric sheets, wherein the flexible film is impermeable to air, the flexible film forming at least part of a vacuum bag which surrounds the plurality of reinforcing fiber fabric sheets;
   evacuating air from the vacuum bag such that a vacuum is formed within the plurality of fiberglass fabric sheets, thereby pressing the flexible film against the plurality of reinforcing fiber fabric sheets to force the plurality of reinforcing fiber fabric sheets to adapt the shape of the mold;
   admitting a polymer resin to the vacuum bag such that the vacuum pulls the resin into voids within the plurality of reinforcing fiber fabric sheets, thereby infusing the plurality of reinforcing fiber fabric sheets with the polymer resin;
   curing the polymer resin such that polymer resin solidifies to form a polymer matrix.

According to a ninth aspect of the present inventive concept there is provided a resin infusion method for producing a wind turbine component, the method comprising:
   placing a stack of sheets on top of a mold, the stack of sheets comprising a plurality of reinforcing fiber fabric sheets and at least one radar absorbing prepreg sheet, wherein the at least one radar absorbing prepreg sheet comprise reinforcing fiberglass or reinforcing carbon fibers, the reinforcing fiberglass or reinforcing carbon fibers being pre-impregnated with a polymer resin and radar absorbing particles, and wherein the mold forms a shape of at least part of the wind turbine component;
   placing a flexible film on top of the stack of sheets, wherein the flexible film is impermeable to air, the flexible film forming at least part of a vacuum bag which surrounds the stack of sheets;

evacuating air from the vacuum bag such that a vacuum is formed within the stack of sheets, thereby pressing the flexible film against the stack of sheets to force the stack of sheets to adapt the shape of the mold;

admitting a polymer resin to the vacuum bag such that the vacuum pulls the resin into voids within the stack of sheets, thereby infusing the stack of sheets with the polymer resin;

curing the polymer resin such that polymer resin solidifies to form a polymer matrix.

The plurality of reinforcing fiber fabric sheets in the method according to the ninth aspect may comprise reinforcing fiber fabric according to the sixth aspect. Thus, the reinforcing fiber fabric sheets may have attached radar absorbing particles. Alternatively, the reinforcing fiber fabric sheets may be reinforcing fiber fabric sheets without radar absorbing particles.

It is a realization that a radar absorbing prepreg sheet may be incorporated in the resin infusion process. This may be a cheap and simple way of achieving a radar attenuating layer.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present invention are described thereinafter according to a preferable embodiment, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

In the following the inventive concept will be exemplified with structures wherein the reinforcing fibers are fiberglass fibers. However, it should be understood that the reinforcing fibers may also be carbon fibers.

Figure 1:
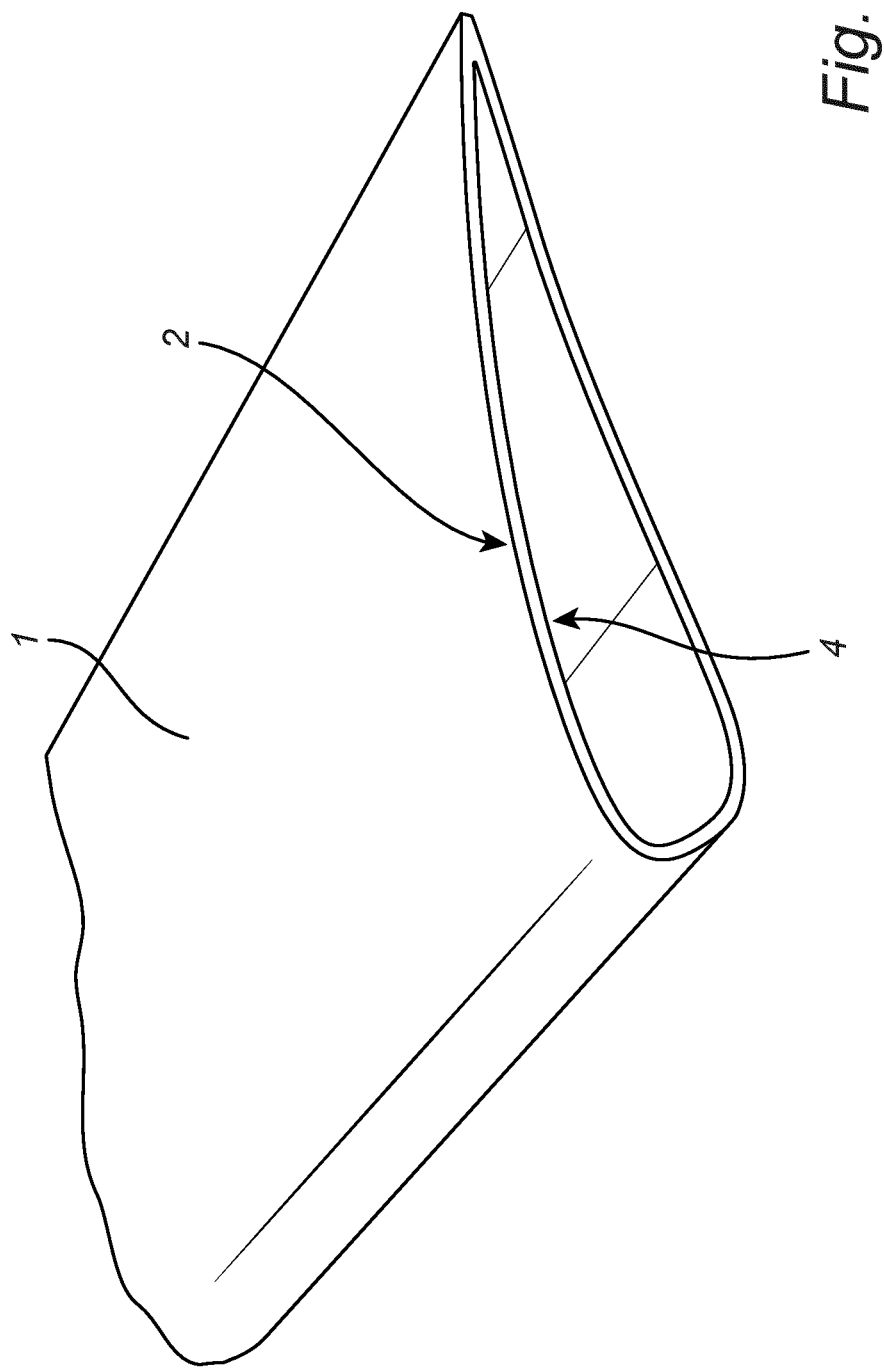
FIG. 1 is cross-section of a wind turbine rotor blade.

A wind turbine component 1 may e.g. be a rotor blade, a nacelle or a nose cone. FIG. 1 illustrates a cross-section of a wind turbine rotor blade. The illustrated rotor blade is constructed as a shell with an outer side 2 and an inner side 4, wherein the shell comprises a laminate of layers 10.

Figure 2:
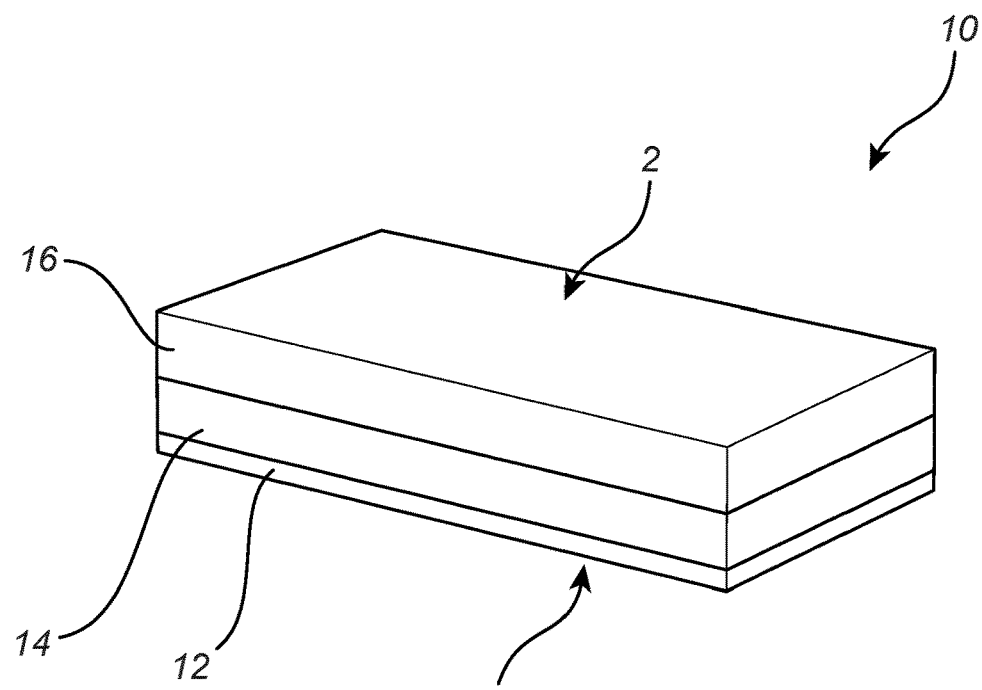
FIG. 2 is a laminate of layers.
Figure 3:
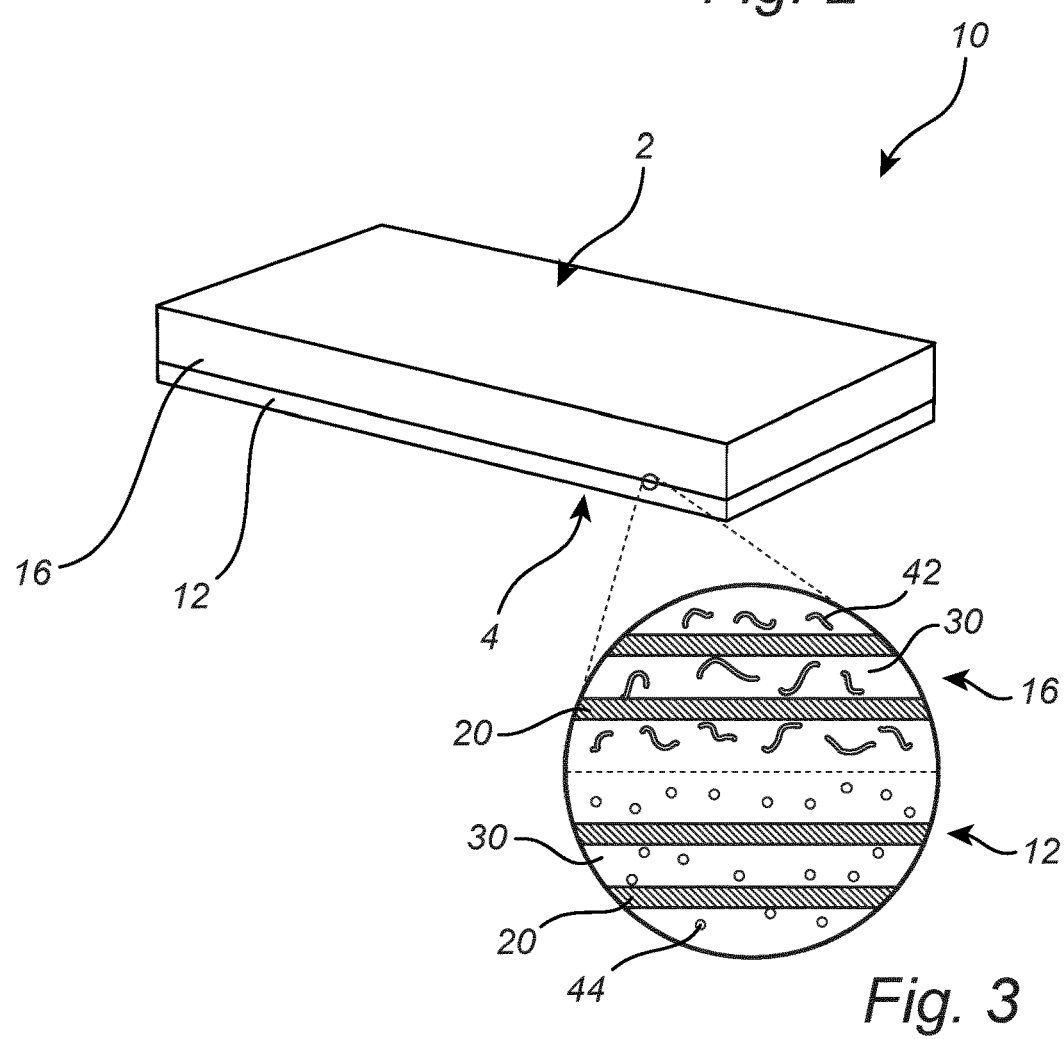
FIG. 3 is a laminate of layers.

FIGS. 2 and 3 illustrate laminate of layers 10. FIG. 2 illustrates a laminate of layers 10 comprising a reflective layer 12, a phase shifting layer 14, and an attenuating layer 16. FIG. 3 illustrates a laminate of layers 10 comprising a reflective layer 12 and an attenuating layer 16. In either case the thicknesses of the layers may be configured to give a reflective loss below a threshold at a frequency, the threshold may be −10 dB.

In FIG. 2 the layers within the laminate of layers 10 are arranged with the reflective layer 12 towards the inner side 4 followed by the phase shifting layer 14 and the attenuating layer 16 towards the outer side. However, it should be understood that further layers are possible both on the outer 2 and inner side 4. For example, on the inner side 4 of the reflective layer 12 there may be layers which do not affect the reflection loss of the laminate of layers 10 but serves to improve the structural integrity of the wind turbine component. In another example, there may be an outermost gel coat layer providing a high-quality finish, UV-resistance and/or improved aerodynamic properties.

In another example the laminate of layers 10 may comprise, from the inner side 4 to the outer side 2, a reflective layer 12, a first phase shifting layer, a first attenuating layer, a second phase shifting layer, and a second attenuating layer. The first and second phase shifting layers may herein have different thicknesses. The first and second attenuating layers may herein have different thicknesses. The thicknesses may be configured such that a radar reflection from the second attenuating layer into the air outside the second attenuating layer has an opposite phase to both a reflection from the first attenuating layer and the reflective layer 12 when these reflections emerge into the air outside the second attenuating layer. The thicknesses may also be configured such that the magnitudes of the three reflections allow the reflections to cancel each other out. It should also be understood that the thicknesses of the first and second phase shifting layers and the first and second attenuating layers may be configured to give a frequency dependence of the reflection loss wherein the reflection loss has at least two local minima. Thus, the reflection loss may be below a threshold, e.g. a threshold of −10 dB, at two different frequencies, e.g. two different frequencies in different radar bands.

FIG. 3 further illustrates a close-up view of the reflective layer 12 and the attenuating layer 16. The structure of the reflective layer 12 and the attenuating layer 16, described hereafter, may be valid for a number of embodiments of the laminate of layers 10. Regardless of whether there is a phase shifting layer 14 between or not. In FIG. 3 the reflective layer 12 comprises sheets of fiberglass fabric 20 and metal particles 44 in a polymer matrix 30. The metal particles may e.g. be attached to the fiberglass or dispersed in the polymer matrix 30. In FIG. 3 the attenuating layer 16 comprises sheets of fiberglass fabric 20 and single-wall carbon nanotubes 42 in a polymer matrix 30. The single-wall carbon nanotubes 42 herein functions as radar absorbing particles 40. The single-wall carbon nanotubes 42 may e.g. be attached to the fiberglass or dispersed in the polymer matrix 30.

Figure 4:
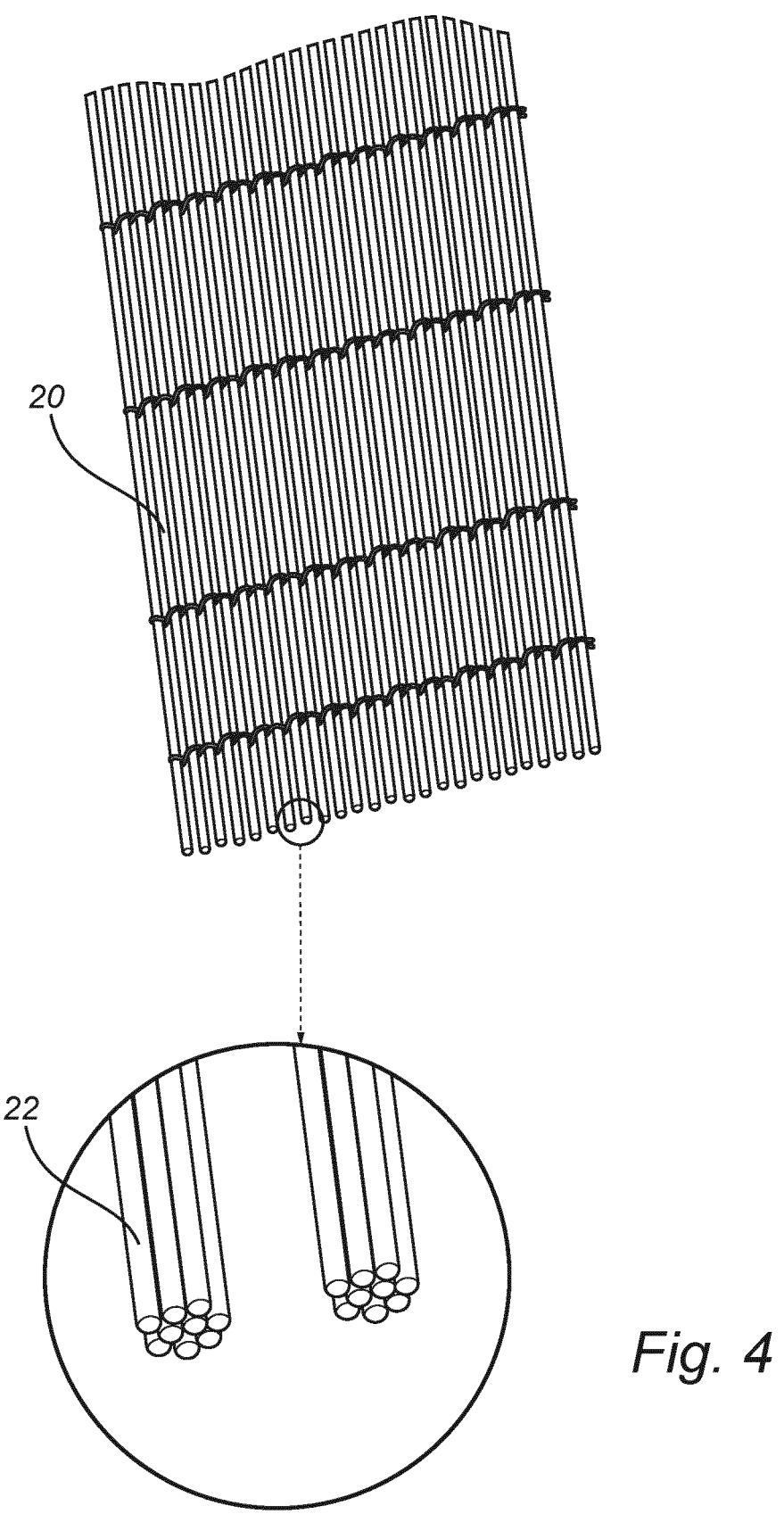
FIG. 4 is a fiberglass fabric.

FIG. 4 illustrates a fiberglass fabric 20 comprising a plurality of fiberglass fibers 22. In the illustrated fiberglass fabric 20 most of the fiberglass fibers 22 aligned along one direction. When the fiberglass fabric 20 is used to produce a wind turbine rotor blade the fiberglass fabric 20 may be laid out with this one direction along the length direction of the rotor blade.

Figure 5:
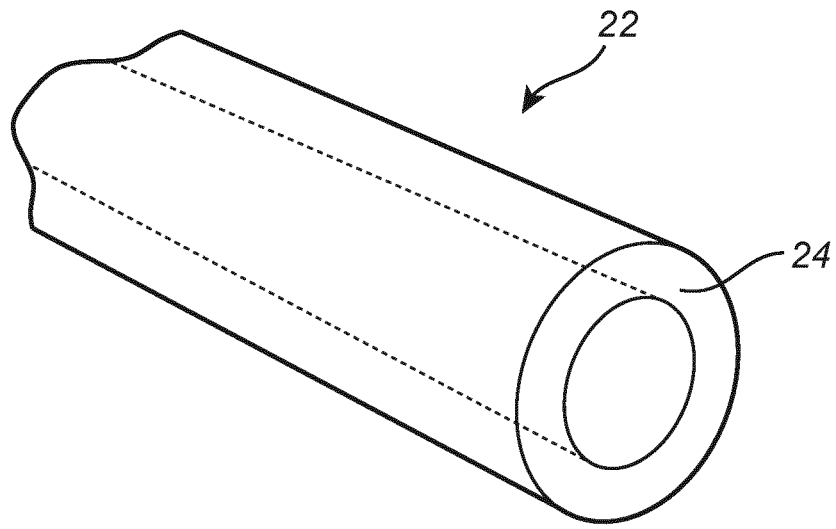
FIG. 5 is a fiberglass fiber.
Figure 6:
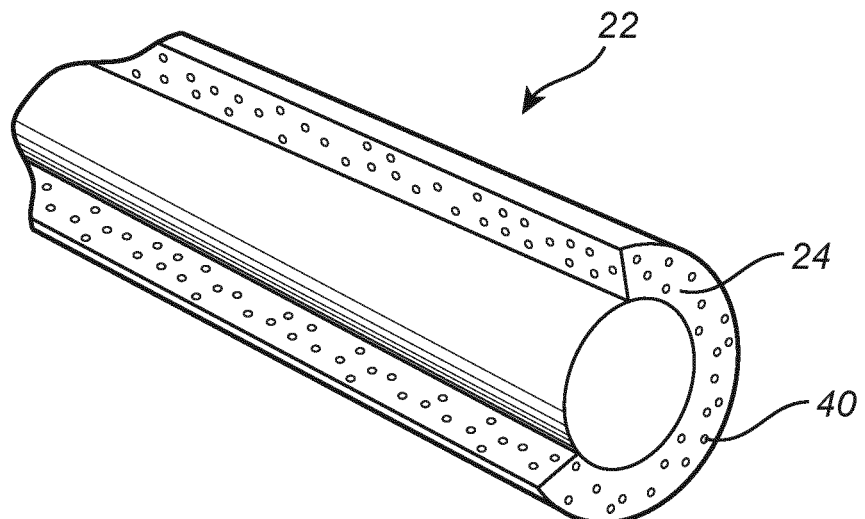
FIG. 6 is a fiberglass fiber.
Figure 7:
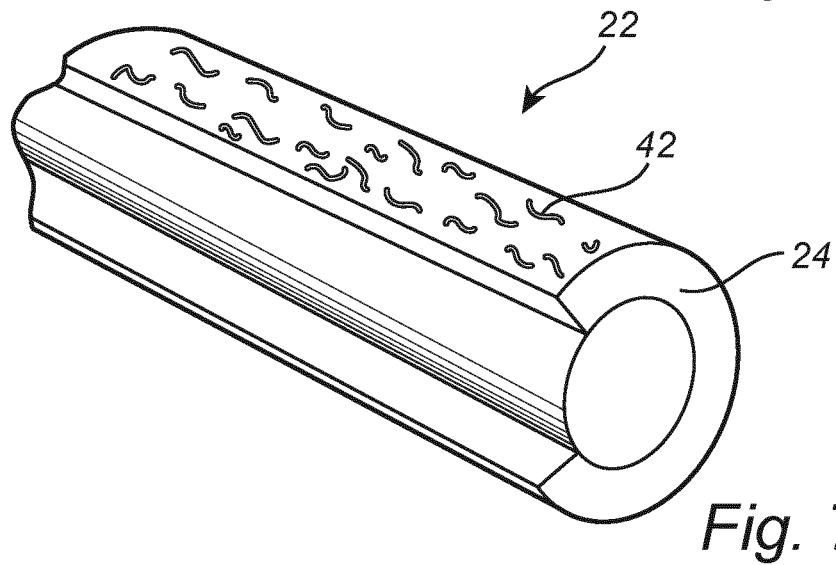
FIG. 7 is a fiberglass fiber.

FIGS. 5-7 illustrate fiberglass fibers 22. FIG. 5 illustrates a fiberglass fiber 22 with a sizing 24 in the form of a coating around a glass fiber. The fiberglass sizing 24 may comprise a film former and a coupling agent. FIG. 6 illustrates a cutaway view of a fiberglass fiber 22 with a sizing 24, wherein radar absorbing particles 40 are dispersed within the fiberglass sizing 24. FIG. 7 illustrates a cutaway view of a fiberglass fiber 22 with a sizing 24, wherein radar absorbing particles 40, in this case single-wall nanotubes 42, are distributed on the outer surface of the fiberglass sizing 24.

Figure 8:
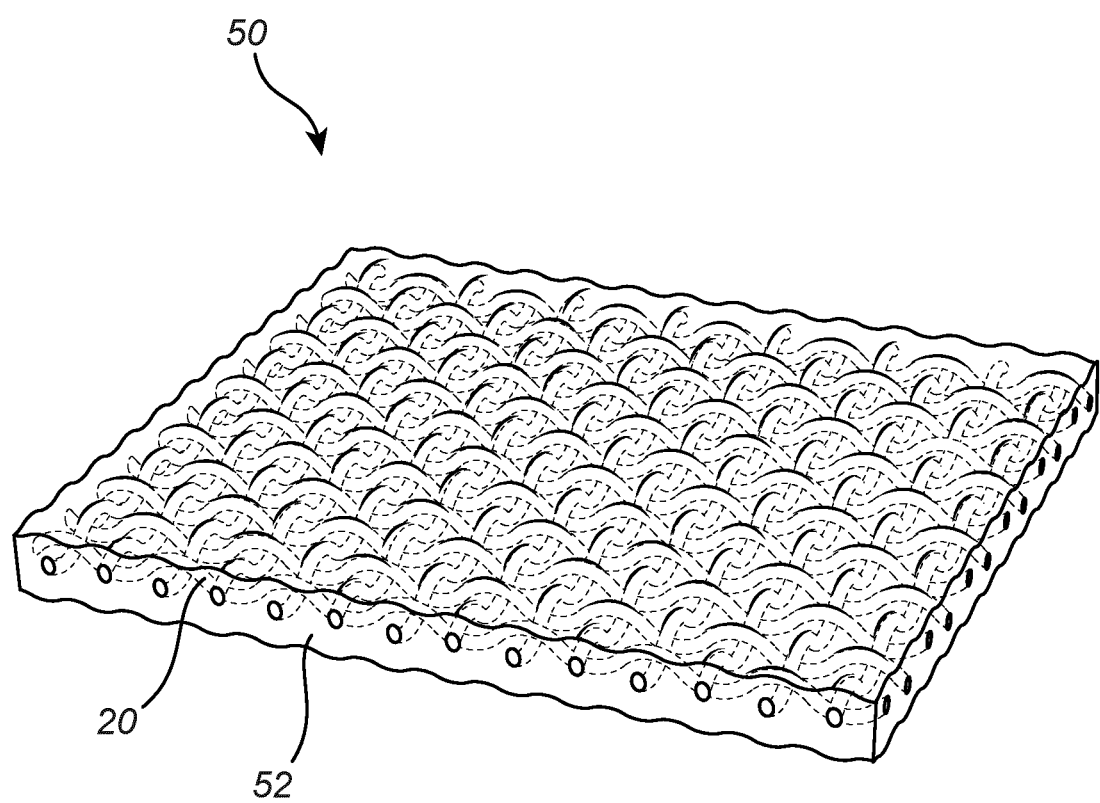
FIG. 8 is a prepreg.

FIG. 8 illustrates a fiberglass prepreg 50. The prepreg 50 comprises a sheet of fiberglass fabric 20, in the illustrated case a woven sheet of fiberglass fabric 20, which is pre-impregnated with polymer resin. The polymer resin may be partially cured to allow easy handling. The prepreg 50 may further comprise radar absorbing particles 40 such that when the prepreg 50 is cured it may form part of an attenuating layer 16.

The wind turbine component 1 may be produced in many different ways, as readily understood by the skilled person. Two methods, encompassed by the inventive concept, may be particularly useful. The methods will in the following be described in conjunction with FIGS. 9-11.

Figure 9:
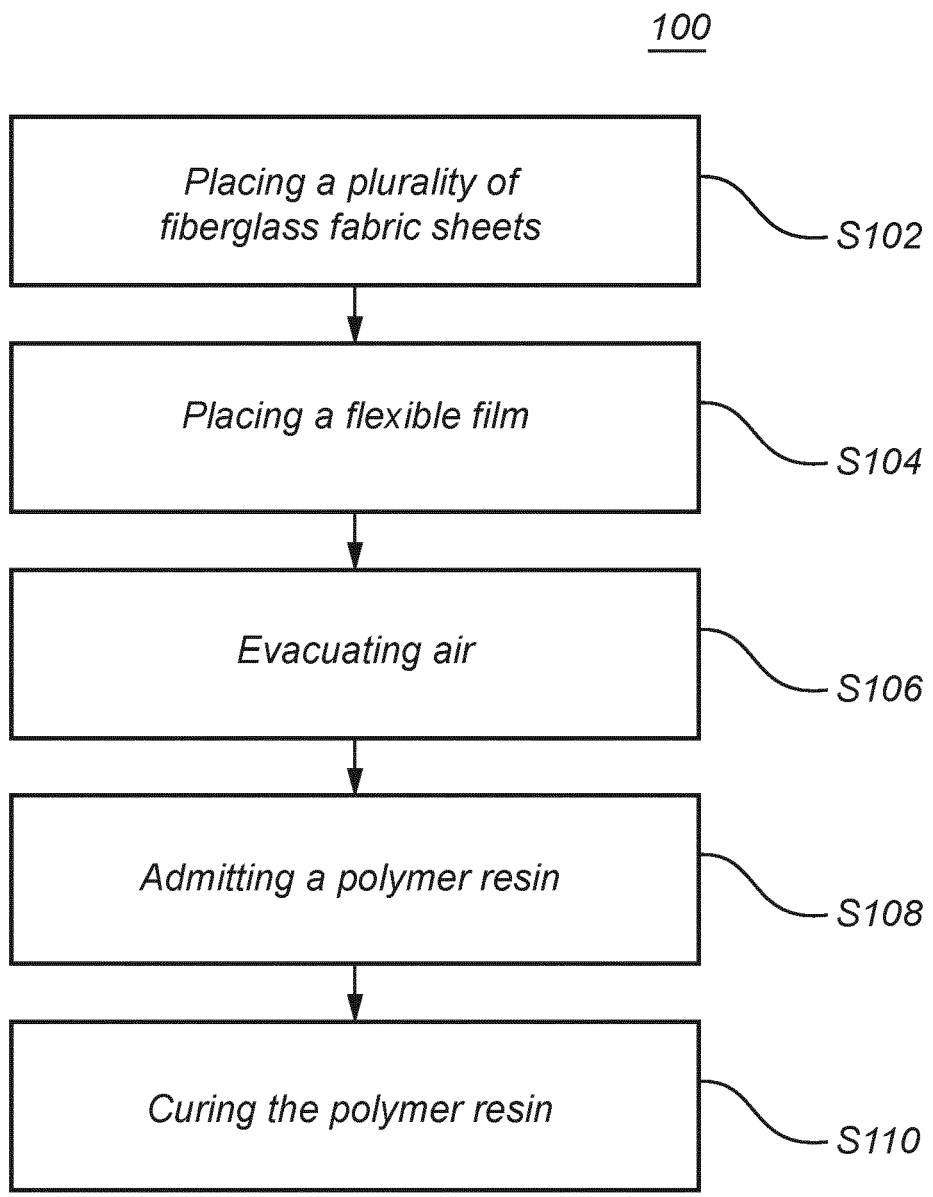
FIG. 9 is a flow chart of a resin infusion method.
Figure 10:
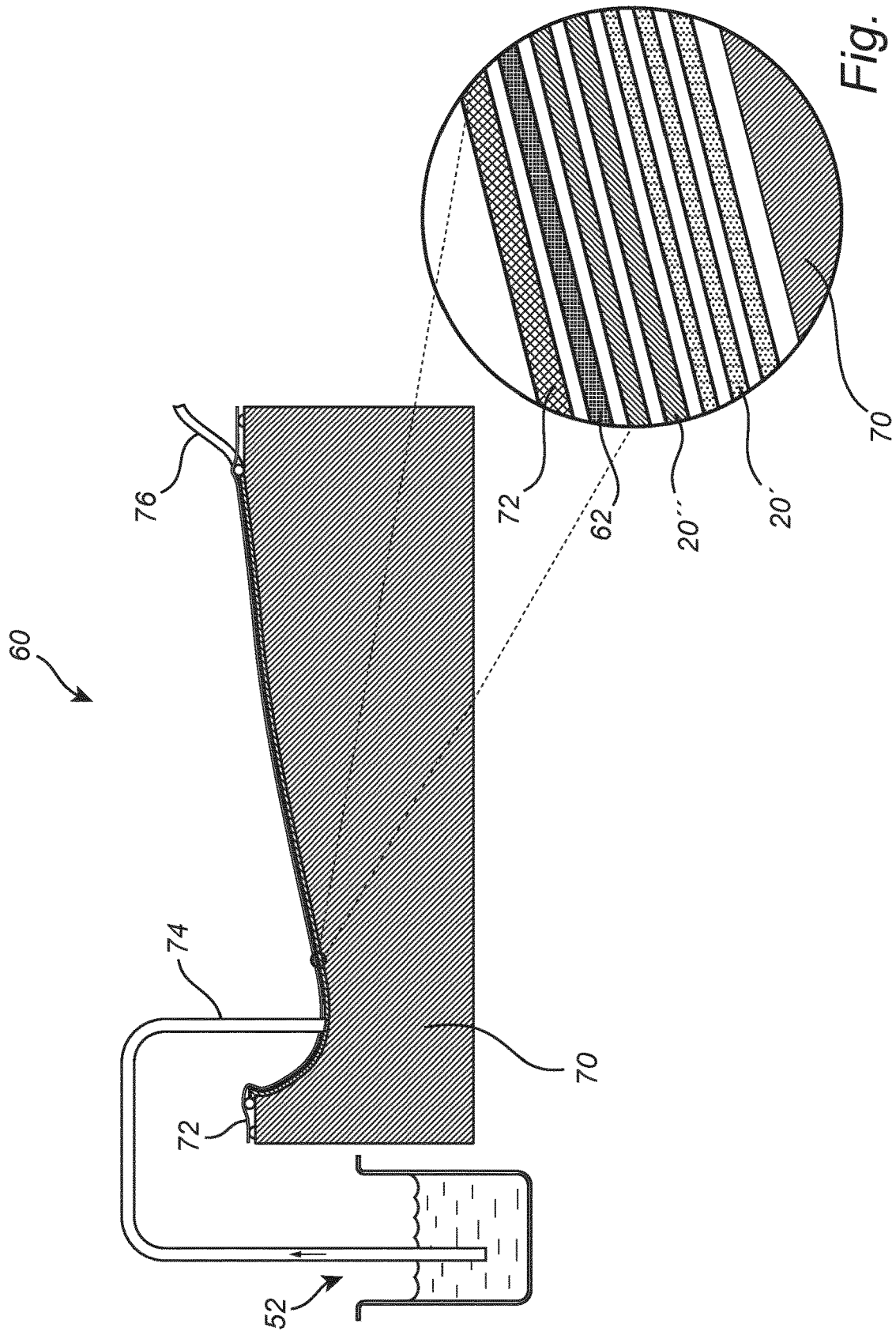
FIG. 10 is a resin infusion setup.

A resin infusion method 100 for producing a wind turbine component will hereinafter be described in conjunction with FIGS. 9 and 10. FIG. 9 is a flow chart of the resin infusion method 100 comprising steps S102, S104, S106, S108 and S110. FIG. 10 illustrates a cross-section of a resin infusion setup 60 which may be used with the resin infusion method 100. The close-up view of the cross-section of the resin infusion setup 60 in FIG. 10 illustrates a stack of sheets of fiberglass fabric 20 that will form part of the laminate of layers 10 after resin infusion. The sheets of fiberglass fabric 20 may be sheets of fiberglass fabric 20' with attached radar absorbing particles or sheets of fiberglass fabric 20" without attached particles.

The illustrated resin infusion setup 60 comprises a mold 70, wherein the mold 70 forms the shape of half of a rotor blade which is divided lengthwise. The surface of the mold 70 may be covered with a gel coat. In step S102 a plurality of sheets of fiberglass fabric 20' with attached radar absorbing particles are placed on top of each other on top of the mold. The number of sheets of fiberglass fabric 20' with attached radar absorbing particles may herein define the thickness of the future attenuating layer 16. After the sheets of fiberglass fabric 20' with attached radar absorbing particles have been laid out, a number of sheets of fiberglass fabric 20" without attached particles may be stacked on top. The number of sheets of fiberglass fabric 20" without attached particles may herein define the thickness of the future phase shifting layer 14. The sheets of fiberglass fabric 20" without attached particles may of course be excluded if a phase shifting layer 14 is not needed. After the sheets of fiberglass fabric 20" without attached particles have been laid out, a reflective film 62 may be placed on top. The reflective film 62 may e.g. comprise a metal film or one or more sheets of fiberglass fabric 20 with attached metal particles, a carbon textile is another alternative. In step S104 a flexible film 72, wherein the flexible film 72 is impermeable to air, is placed on top of the previously laid sheets and films. In FIG. 10 the flexible film 72 and the mold 70 together forms a vacuum bag. A resin inlet 74 is connected to a reservoir of polymer resin 52. A vacuum outlet 76 is connected to a vacuum pump with a resin trap. Air is evacuated from the vacuum bag via the vacuum outlet 76 with the resin inlet 74 closed, S106. Thus, the sheets of fiberglass fabric 20 and the reflective film 62 is pressed against the mold 70, thereby forcing them to adapt the shape of the mold 70. By opening the resin inlet 74, the polymer resin 52 is admitted into the vacuum bag, S108, thereby infusing the sheets of fiberglass fabric 20 with polymer resin 52. Finally, the polymer resin 52 is cured, S110, still under vacuum pressure, to form the polymer matrix 30. The result will be a laminate of layers 10 in the shape of the mold 70.

Figure 11:
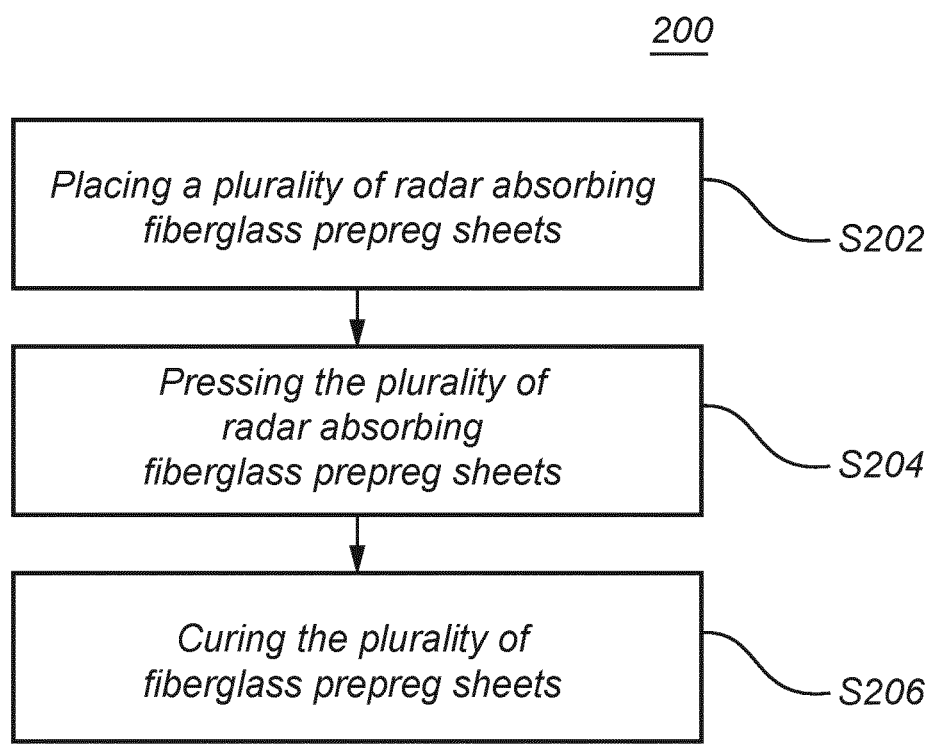
FIG. 11 is a flow chart of a prepreg method.

A prepreg method 200 for producing a wind turbine component will hereinafter be described in conjunction with FIG. 11. FIG. 11 is a flow chart of the prepreg method 200 comprising steps S202, S204, and S206. The setup for a prepreg method 200 may be similar to the setup illustrated in FIG. 10. However, for a prepreg method there may not be any need for any additional polymer resin 52 other than the polymer resin 52 which the prepreg is already pre-impregnated with. Consequently, the resin inlet 74 may not be needed. The prepreg method 200 may comprise the use of fiberglass prepregs 50. The fiberglass prepregs 50 may be fiberglass prepregs 50' with radar absorbing particles and fiberglass prepregs 50" without radar absorbing particles. However, the method may not necessarily make use of fiberglass prepregs 50" without radar absorbing particles.

In step S202 of the prepreg method 200 a plurality of radar absorbing fiberglass prepregs 50' are placed on top of each other on top of the mold 70, wherein each of the radar absorbing fiberglass prepregs 50' comprises reinforcing fiberglass pre-impregnated with a polymer resin 52 and radar absorbing particles 40. The number of radar absorbing fiberglass prepregs 50' may herein define the thickness of the future attenuating layer 16. A plurality of prepregs 50" without radar absorbing particles may subsequently be stacked on top of the radar absorbing fiberglass prepregs 50'. The number of prepregs 50" without radar absorbing particles may herein define the thickness of the future phase shifting layer 14. The prepregs 50" without radar absorbing particles may of course be excluded if a phase shifting layer 14 is not needed. After the prepregs 50" without radar absorbing particles have been laid out, a reflective film 62 may be placed on top. A flexible film 72, wherein the flexible film 72 is impermeable to air, may be placed on top of the previously laid sheets and films. The flexible film 72 and the mold 70 may together form a vacuum bag.

In step S204 the prepregs 50 may be pressed against the mold 70 by evacuating air from the vacuum bag via the vacuum outlet. Thus, the prepregs 50 and the reflective film 62 is pressed against the mold 70, thereby forcing them to adapt the shape of the mold 70.

Finally, the fiberglass prepregs 50 are cured, S206, still under vacuum pressure such that the fiberglass prepregs 50 bond together and the polymer resin 52 solidifies to form a polymer matrix 30. The result will be a laminate of layers 10 in the shape of the mold 70.

In the above the inventive concept has mainly been described with reference to a limited number of examples. However, as is readily appreciated by a person skilled in the art, other examples than the ones disclosed above are equally possible within the scope of the inventive concept, as defined by the appended claims. It should be understood that the examples may be combined in any number of ways.

What is claimed is:

1. A wind turbine component, the wind turbine component comprising a laminate of layers, the laminate of layers comprising an outer side and an inner side, wherein the outer side faces an exterior of the wind turbine component and the inner side faces an interior of the wind turbine component, the laminate of layers being configured to reflect a radar wave impinging the outer side of the laminate of layers, wherein a reflection loss of the reflected radar wave is below a threshold at a frequency, the laminate of layers comprising:

an attenuating layer comprising a first reinforcing fiber fabric and a first polymer matrix, wherein the first reinforcing fiber fabric comprises a plurality of first reinforcing fibers onto which radar absorbing particles are attached, the plurality of first reinforcing fibers being reinforcing fiberglass or reinforcing carbon fibers, wherein the plurality of first reinforcing fibers are intertwined to form the first reinforcing fiber fabric, wherein the radar absorbing particles form a conformal coating around each reinforcing fiber of the plurality of first reinforcing fibers, and wherein the radar absorbing particles of the conformal coating around each reinforcing fiber of the plurality of first reinforcing fibers comprise one or more of carbon nanotubes, carbon black, or a metal-organic framework;
- a reflective layer comprising a second reinforcing fiber fabric and a second polymer matrix, wherein the second reinforcing fiber fabric comprises a plurality of second reinforcing fibers onto which metal particles are attached, wherein the plurality of second reinforcing fibers are intertwined to form the second reinforcing fiber fabric, wherein the metal particles are attached to each reinforcing fiber of the plurality of second reinforcing fibers; and
- a phase shifting layer between the attenuating layer and the reflective layer, the phase shifting layer comprising a reinforcing fiberglass or reinforcing carbon fibers and a third polymer matrix,
- wherein the phase shifting layer has a thickness configured to set a phase difference between a radar wave reflection from the attenuating layer and a radar wave reflection from the reflective layer to provide at least partially destructive interference between the radar wave reflection from the attenuating layer and the radar wave reflection from the reflective layer at the frequency,
- wherein the reflective layer is arranged on an inner side of the attenuating layer, the reflective layer being configured to reflect a transmitted portion of the radar wave, the transmitted portion of the radar wave being a portion of the radar wave that has passed through the attenuating layer.

2. The wind turbine component according to claim 1, wherein the radar absorbing particles of the conformal coating around each reinforcing fiber of the plurality of first reinforcing fibers of the attenuating layer comprise single-wall carbon nanotubes.

3. The wind turbine component according to claim 1, wherein the laminate of layers is configured to have a reflection loss below the threshold at a frequency in the L-band, in the S-band or in the Xband, the L-band being a frequency band between 1 GHz and 2 GHz, the S-band being a frequency band between 2 GHz and 4 GHZ, the X-band being a frequency band between 8 GHz and 12 GHz.

4. The wind turbine component according to claim 1, wherein the laminate of layers is configured to have a reflection loss below the threshold at a frequency in the S-band as well as at a frequency in the X-band.

5. The wind turbine component according to claim 1, wherein the conformal coating around each reinforcing fiber of the plurality of first reinforcing fibers comprises a coating that conforms to a surface around a circumference of each reinforcing fiber.

6. The wind turbine component according to claim 1, wherein the conformal coating around each reinforcing fiber of the plurality of first reinforcing fibers evenly distributes the radar absorbing particles around a circumference of each reinforcing fiber.

7. The wind turbine component according to claim 1, wherein the conformal coating around each reinforcing fiber of the plurality of first reinforcing fibers is configured such that a probability of finding one of the radar absorbing particles is constant around a circumference of each reinforcing fiber.

8. The wind turbine component according to claim 1, wherein the metal particles of the reflective layer form a conformal coating around each reinforcing fiber of the plurality of second reinforcing fibers of the reflective layer.

9. The wind turbine component according to claim 1, wherein the metal particles of the reflective layer comprise aluminum.

10. The wind turbine component according to claim 1,
- wherein the phase shifting layer has a thickness configured to set a phase difference between a radar wave reflection from the attenuating layer and a radar wave reflection from the reflective layer, the phase difference being configured to give at least partially destructive interference between the radar wave reflection from the attenuating layer and the radar wave reflection from the reflective layer at the frequency;
- wherein the radar absorbing particles of the conformal coating around each reinforcing fiber of the plurality of reinforcing fibers of the attenuating layer comprise single-wall carbon nanotubes.

11. A wind turbine component, the wind turbine component comprising a laminate of layers, the laminate of layers comprising an outer side and an inner side, wherein the outer side faces an exterior of the wind turbine component and the inner side faces an interior of the wind turbine component, the laminate of layers being configured to reflect a radar wave impinging the outer side of the laminate of layers, wherein a reflection loss of the reflected radar wave is below a threshold at a frequency, the laminate of layers comprising
- an attenuating layer comprising a first reinforcing fiber fabric, a first polymer matrix, and radar absorbing particles dispersed in the first polymer matrix of the attenuating layer, wherein the radar absorbing particles comprise one or more of carbon nanotubes, carbon black, or a metal-organic framework;
- a reflective layer comprising a second reinforcing fiber fabric, a second polymer matrix, and metal particles; and
- a phase shifting layer, the phase shifting layer being a layer between the attenuating layer and the reflective layer, the phase shifting layer comprising a reinforcing fiberglass or reinforcing carbon fibers and a third polymer matrix,
- wherein the phase shifting layer has a thickness configured to set a phase difference between a radar wave reflection from the attenuating layer and a radar wave reflection from the reflective layer to provide at least partially destructive interference between the radar wave reflection from the attenuating layer and the radar wave reflection from the reflective layer at the frequency,
- wherein the reflective layer is arranged on an inner side of the attenuating layer, the reflective layer being configured to reflect a transmitted portion of the radar wave, the transmitted portion of the radar wave being a portion of the radar wave that has passed through the attenuating layer, and
- wherein a third polymer matrix of the phase shifting layer adjacent to the attenuating layer is free from the radar absorbing particles.

12. The wind turbine component according to claim 11, wherein the second reinforcing fiber fabric comprises a plurality of second reinforcing fibers onto which the metal particles are attached, and wherein the plurality of second reinforcing fibers are intertwined to form the second reinforcing fiber fabric, and wherein the metal particles are attached to each reinforcing fiber of the plurality of second reinforcing fibers.

13. The wind turbine component according to claim 11, wherein the radar absorbing particles dispersed in the first polymer matrix of the attenuating layer comprise single-wall carbon nanotubes.

14. The wind turbine component according to claim 11, wherein the metal particles of the reflective layer are dispersed in the second polymer matrix of the reflective layer.

15. The wind turbine component according to claim 11, wherein the metal particles of the reflective layer comprise aluminum.

\* \* \* \* \*